US006691927B1

(12) United States Patent
Malloy

(10) Patent No.: US 6,691,927 B1
(45) Date of Patent: Feb. 17, 2004

(54) APPARATUS AND METHOD FOR FLUID EMISSION CONTROL BY USE OF A PASSIVE ELECTROLYTIC REACTION

(76) Inventor: Robert J. Malloy, 2345 Buckskin Dr., Englewood, FL (US) 34223

( * ) Notice: Subject to any disclaimer, the term of this patent is extended or adjusted under 35 U.S.C. 154(b) by 338 days.

(21) Appl. No.: 09/941,821

(22) Filed: Aug. 29, 2001

(51) Int. Cl.[7] .................................... A01G 23/10

(52) U.S. Cl. .................... 239/3; 239/690; 239/708; 210/748; 204/272; 204/275.1; 204/278.5; 204/547; 205/761; 123/538

(58) Field of Search .................... 239/3, 690, 708; 210/748; 204/272, 275.1, 278.5, 547; 205/742, 761, 762, 754; 123/536, 538

(56) References Cited

U.S. PATENT DOCUMENTS 4,381,533 A 4/1983 Coffee
4,573,904 A 3/1986 Babington
4,761,299 A 8/1988 Hufstetler et al.
5,154,807 A * 10/1992 Harvey .................... 204/272
5,431,797 A * 7/1995 Harvey .................... 204/272
5,671,719 A * 9/1997 Jeong .................... 123/538
5,868,321 A 2/1999 Haruch
5,871,000 A 2/1999 Ratner
5,881,702 A 3/1999 Arkfeld
6,024,073 A * 2/2000 Butt .................... 123/538
6,032,655 A 3/2000 Kavonius
6,053,152 A 4/2000 Ratner
6,099,914 A 8/2000 Yoshida et al.
6,161,778 A 12/2000 Haruch
6,270,650 B1 * 8/2001 Kazi et al. .................... 204/275.1
6,276,346 B1 8/2001 Ratner
6,368,472 B1 * 4/2002 McGuire .................... 204/275.1
6,386,187 B1 * 5/2002 Phykitt .................... 123/538

OTHER PUBLICATIONS

"Technical Support Package on Electrostatic Dispersion of Fuel Drops to Reduce Soot" Josette Bellan, Kenneth G. Harstad; National Aeronautics and Space Administration Contract No. NAS 7–918; Jet Propulsion Laboratory, California Institute of Technology, Pasadena, California; Apr. 1998.

* cited by examiner

*Primary Examiner*—Steven J. Ganey
(74) *Attorney, Agent, or Firm*—Robert L. Wolter, Esq.

(57) ABSTRACT

An apparatus and method for fluid emission control of a conductive fluid utilizes a passive electrolytic reaction to ionize the conductive fluid. The apparatus includes a fluid emission system having a reaction chamber that includes an anode and cathode to initiate an electrolytic reaction within the conductive fluid and reaction chamber. An ion-generating member is disposed within the reaction chamber and enhances the electrical bias in the conductive fluid. An oxidation-controlling member disposed within the reaction chamber retards oxidation of the anode and cathode. The metallic component parts and amount of such component parts used in the reaction chamber are chosen to achieve a target voltage, which that amount of voltage created, by the electrolytic reaction necessary to charge a fluid droplet of any density to achieve a maximum acceleration of fluid droplets as the fluid droplets enter and leave a spray cone.

26 Claims, 2 Drawing Sheets

APPARATUS AND METHOD FOR FLUID EMISSION CONTROL BY USE OF A PASSIVE ELECTROLYTIC REACTION

This invention relates generally to the processes, techniques or devices used to generate electrolytic reactions and/or solutions. More specifically, the invention pertains to those processes, techniques or devices involving passive electrolytic reactions, and are used to alter the dispersement of a conductive fluid in which a reaction takes place.

BACKGROUND OF THE INVENTION

Fluids are often discharged from canisters in the form of a spray or mist, which may be defined as a liquid moving in a mass of dispersed droplets. The fluid is usually contained in a pressurized container that has an opening through which the fluid is discharged from the canister. As the fluid travels from the canister having a pressure greater than atmospheric pressure to ambient atmospheric conditions, the fluid dramatically expands. In some cases the fluid is atomized. That is, the fluid is dispersed into individual droplets.

A variety of systems exist for atomizing fluids. A spray canister may be equipped with a nozzle having an orifice through which the fluid is discharged from the canister. The fluid is treated, either through some mechanical, chemical or electrical means upstream from the nozzle, or adjacent the nozzle orifice.

For example, the fluid may be subjected to a pressurized gas, such as air, in an atomizing chamber, before the fluid is discharged through one or more orifices. Paint-spraying mechanisms impart an electrostatic charge to the paint causing the paint to disperse from a canister in an atomized spray form consisting of similarly charged paint particles. Mechanical devises such as rotating discs, atomizing bulbs or metallic baffles are also used to atomize fluids.

The extent of atomization depends on the amount of pressure under which the fluid is contained, the density of the fluid and the method of discharge or atomization. In many cases, atomizing and discharging the fluid in smaller droplets achieve higher spray efficiency. A spray with smaller, and more droplets, covers a larger surface area covered by the spray; the smaller droplets travel farther than larger droplets; the smaller droplets increase the surface area exposed for oxidation or evaporation; and smaller droplets may adhere better to a surface than larger droplets, which have a tendency to agglomerate.

With respect to electrostatically charged fluids, when the fluid is discharged, fluid is dispersed into droplets having similar ionic charges. Thus, the droplets disperse and repel one another into a spray cone. A spray cone is an area, volume and shape of a spray mist through which fluid droplets accelerate or move, in the same direction relative to one another. Prior to entering the cone, the fluid is in a condensed form. Once the fluid is released from an emission system and atomized into droplets, the fluid droplets accelerate from a point of atomization at a spray nozzle, or orifice, through the spray cone. Eventually the spray cone will dissipate. The droplets stop accelerating or moving, and begin to concentrate at that instant the spray cone dissipates.

An emission control system attempts to optimize a spray cone density in order to maintain the spray cone for an optimal distance and time. In addition, an optimal spray density is desirable to generate the maximum number of droplets moving within a spray cone. Optimal spray cone density can be defined as the number of fluid droplets within a preselected volume of the spray cone. A dilute spray cone is a cone in which the fluid droplets are not touching and yet still accelerating through the spray cone. A concentrated spray cone is one in which droplets agglomerate, and fewer and larger droplets are accelerating through the spray cone.

Electrostatically induced fluids oftentimes are "overcharged" or too much voltage and current are applied to the fluid. If too much voltage is applied, then the charge (or bias) in the fluid, or individual droplets, is discharged and the fluid is not ionized; or if the fluid is dispersed, then the fluid condenses prematurely, and the fluid does not achieve an optimal spray cloud density. This is known as the Rayleigh Limit: A droplet of known radius and density will discharge when it reaches this limit. If an insufficient amount of voltage or current is applied, then the fluid will not effectively ionize, and a concentrated spray cone is produced.

An emission control system attempts to optimize a spray cone density in order to maintain the spray cone for an optimal distance and time. In addition, an optimal spray density is desirable to generate the maximum number of droplets moving within a spray cone. Thus, in order to achieve the optimal spray cones density, one must achieve an optimal acceleration of the fluid droplets within the spray cone, and an optimum radius reduction of the droplets where the optimum reduced radius is the smallest droplet radius that contains the smallest number of cohesive molecules of a conductive fluid. These factors are known by those skilled in the art for various fluids such as diesel fuel, which droplets have a 5 to 6 micron radius containing approximately 500–600 molecules; or gasoline droplets having a radius of 2.5 to 3.0 microns contain up to 300 molecules.

However, a need exists for a method and/or apparatus that induces a target voltage or current in a conductive fluid, at target current an optimum droplet acceleration and an optimum droplet radius reduction are achieved for effective atomization of the conductive fluid at the target current.

SUMMARY OF THE INVENTION

The present invention provides a means for inducing atomization of a liquid that is applicable to a variety of fluid spray media such as pesticides, paint, cosmetics or fuel. More specifically, the present invention biases a conductive fluid by passive electrolytic ionization. This reaction may also be referred to as an oxidation-reduction reaction, where oxidation takes place at a cathode and reduction takes place at the anode, as known to those skilled in the art. A conductive fluid is introduced into a reaction chamber in which an electrolytic reaction takes place. An anode and cathode are disposed within the reaction chamber. An ion-generation member is secured within the chamber to enhance the charge in the conductive fluid, and an oxidation control member is also disposed in the reaction chamber to inhibit oxidation of the anode and the cathode. In addition, a magnet is preferably mounted within the reaction chamber adjacent an outlet portal of the reaction chamber to generate a magnetic field adjacent the outlet portal of the reaction chamber and maintain the electrolytic reaction within the reaction chamber.

As fluid is discharged from the system, the elecrolytically charged fluid is dispersed into negatively charged droplets. The negatively charged ions repel one another, generating small fluid droplets, which result in a finer, less dense mist. In addition, the droplets have a greater acceleration from the point of spray atomization due to the repulsion of the like-charged droplets.

The electrolytic reaction within the reaction chamber and conductive fluid is maintained at an Average Current (Ac)

which is defined as the power (P) needed to charge a fluid droplet of a known density divided by an initial spray cloud (cone) voltage ($V_0$). These calculations incorporate two constants, which are necessary to determine an Ac for a fluid of a known density. The first constant is the fraction of the instant of droplet combustion ($F_c$) measured in coulombs, during which a droplet in a spray cones expansion ceases, and has been calculated as $\frac{1}{2}(1.036\times10^{-18})$. The second constant is the ratio between the evaporation instant of a spray cone and the time of evaporation of a conductive fluid of a known density, or $J_{0/2}$, which is $\frac{1}{2}(0.74)^{1/3}$. The calculation of the Ac is explained in more detail below. In this manner, the equivalent weights of selected metals for the electrolytic reaction are determined for a specific range of conductive fluid densities.

DETAILED DESCRIPTION OF THE INVENTION

The invention is now described with reference to FIGS. 1 and 2, which illustrate an enabling apparatus and method. However, the invention is not intended to be limited by this specific embodiment. Moreover, the description of the drawings serves as a detailed explanation of the invention and is not intended to be limiting.

Figure 1:
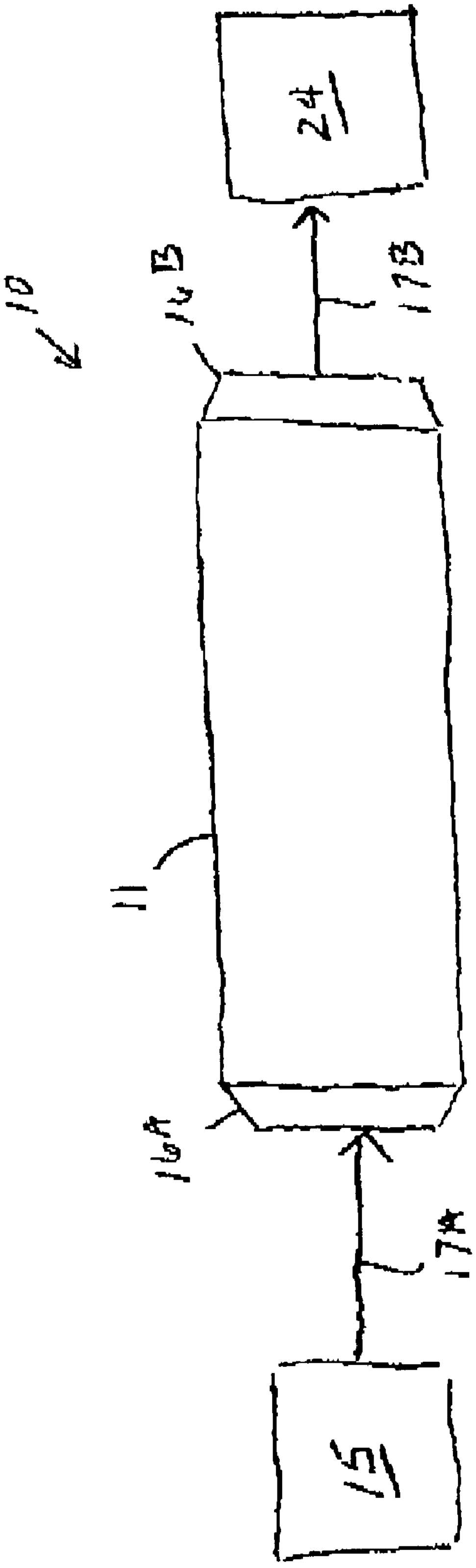
FIG. 1 is a schematic of the fluid emission control system.
Figure 2:
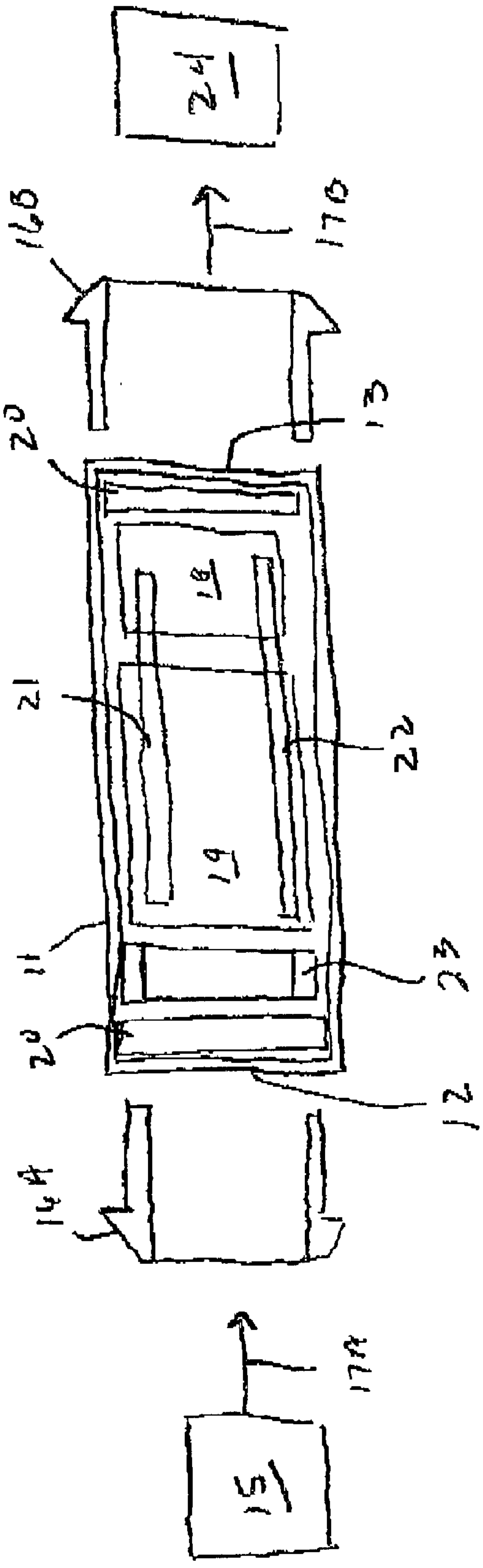
FIG. 2 is a sectional view of the reaction chamber.

With respect to FIGS. 1 and 2, an electrolytic ionization system 10 is depicted, and includes a reaction chamber 11 in fluid communication with a fluid supply 15 and discharge mechanism 24. The reaction chamber 11 shown in FIGS. 1 and 2 is a cylindrical reaction chamber constructed of acceptable nonreactive material such as metal, plastic, fiberglass, etc. An inlet portal 12 is disposed at one end of the reaction chamber 11 and an outlet portal 13 is disposed at an opposite end of the reaction chamber 12.

Fluid lines 17A and 17B interconnect the reaction chamber 12 with a fluid supply 15 and a discharge mechanism 24, respectively. The discharge mechanism 24 can be any device that includes a nozzle, with an orifice (or plurality of orifices) and means to initiate the discharge of fluid from a system through the orifice.

End cap 16A and 16B are mounted in sealing relationship to the inlet portal 12 and outlet portal 13, respectively. The end caps 16A and 16B can be threaded, press-fitted or otherwise have an acceptable sealing engagement with the reaction chamber 11 to prevent leaking from the lines 17A and 17B, and the reaction chamber 11. The end caps 16A and 16B have apertures 25 through which fluid flows, and are adapted to connect to lines 17A and 17B.

A screen 20 is mounted at each end of the reaction chamber 11 to maintain the different internal component parts within the reaction chamber 11. The screen 20 can be any metallic screen, wire, sponge or perforated plate.

An anode 18 and cathode 19 are disposed within the reaction chamber 11 to induce an electrolytic reaction within the chamber 11, thereby creating an electrolytic solution within the reaction chamber 11. The cathode 19 and anode 18 are composed of dissimilar metals (metals having different atomic weights) and are typically used in such devices. The anode 18 is preferably composed of stainless steel for the consumption of the cupric ions generated from the copper cathode 18. As suggested, the cathode 19 is preferably composed of copper or nickel. The anode 18 and cathode 19 preferably take the form of metallic sponges, wire meshes, or pellets and support other component parts within the reaction chamber 11.

A fluid supply 15 provides conductive fluid 27 to the reaction chamber 11. The conductive fluid 27 fills the lines 17A and 17B and the reaction chamber 11. The conductive fluid 22 can be any fluid that conducts electricity, for example, fuel, pesticides, chemical suspensions and solutions, paint, oil and solvents, etc., but does not include poor conductors such as deionized water. The anode 18 and cathode 19 generate an electrolytic reaction that produces electrons within the conductive liquid.

The electrolytic reaction, which is an oxidation reduction reaction, will reach equilibrium neutralizing the ability of the conductive fluid to maintain ionization. The anode 18 is negatively biased and attracts the cupric ions, thereby creating an electrolytic solution. Electrons in the conductive fluid result from the ionization—an oxidation reaction taking place at the cathode, and thereby enhance an overall charge on the fluid 27. However, the positively charged ions will have an affinity towards the electrons which may reduce the overall negative bias of the conductive fluid 27. A physical manifestation of this attraction is copper plating on the anode (stainless steel), which may eventually consume the copper cathode.

Accordingly, an ion-generating member 21 leaches metal molecules into the conductive fluid to enhance the production and retention of electrons in the conductive fluid. An ion-generating member 21 and oxidation-controlling member 22 are disposed within the reaction chamber 11 and maintain the electrolytic reaction within the reaction chamber. The ion-generating member 21 composed of antimony leaks antimony molecules into the conductive fluid 27 to enhance the charge imparted by the electrolytic reaction within chamber 11. The ion-generating member may also be any one of several metals including cadmium, gold platinum and amalgams.

The oxidation-controlling member 22 is composed of a soft metal bar, pellet or wire such as zinc. The oxidation-controlling member 22 reduces the formation of oxides in the electrolytic solution and enhances the release of electrons, thereby regulating the reduction of the sacrificial metals caused by electrolysis. Some conductive fluids may have the presence of oxygen, especially fluids in the form of an aqueous solution. The presence of oxygen results in oxidation of the anode and cathode. The oxidation-controlling member inhibits oxidation of the anode and cathode by causing oxidation of the zinc. The oxidation-controlling member may also be selected from a group of metals including aluminum, lead, nickel and soft amalgams.

A magnet 23 may also be secured within the reaction chamber adjacent the exit portal 13 and prevents the electrolytic solution of conductive fluid from leaving the reaction chamber 11. The magnet 23 is preferably a torus magnet that generates a positively charged magnetic field adjacent the outlet portal 13 and maintains the reaction within the reaction chamber 11.

In order to maintain the electrolytic reaction at a target voltage, a select amount of weight of each metal component corresponds to different conductive fluids falling within a range of densities. That is to say that for conductive fluids of different or varying densities, different weights of metal components are used. This is done by calculating the amount of voltage to optimally bias a droplet of a conductive fluid of any density to achieve a maximum acceleration of the droplet as the droplet enters a spray cone and leaves a spray cone.

While a variety of metals may be used for the different component parts, the amount of material components can control the bias or charge induced by the electrolytic reaction. A target voltage or target current for a particular conductive fluid of a known density may be calculated. The target voltage or current is that amount of voltage created by the electrolytic reaction necessary to charge a fluid droplet of any density to achieve a maximum acceleration of the fluid droplets as the droplets enter and leave a spray cone.

In a first equation, an individual drop charge ($E_c$) is calculated as a function of droplet mass (m), an initial cloud density ($n_f$) and the time (t) to reach optimum cloud density ($n_0$) according to the following equation:

$$E_c = 1/t + t_0(E_c 1)$$

Where $E_c1$=

$$\sqrt{\frac{3m}{8\pi n_o}}\sqrt{\left(\frac{n_o}{n_f}\right)^{\frac{1}{3}}\left[\left(\frac{n_o}{n_f}\right)^{\frac{1}{3}}-1\right]}+\frac{1}{2}1n\frac{1-\left(\frac{n_o}{n_f}\right)^{\frac{1}{3}}+1}{1\sqrt{1-\left(\frac{n_o}{n_f}\right)^{\frac{1}{3}}}}$$

The initial cloud density is estimated at ~1 for any range of values because of the very dense configuration of the spray cone at the point of discharge there are unlimited Kolmogorov eddy currents between adjacent droplets.

In a second equation, an initial cloud voltage ($V_0$) exists at the instant of cloud formation where cloud formation may be defined as the point of atomization of the conductive fluid, for droplets of a known density, and is calculated as follows:

$$V_o = F_c(J_{0/2}) \cdot R_{0/2}(1r1t)^{\frac{2}{3}} \cdot pd\frac{1}{2}\left(\frac{n_o}{n_f}\right)^{\frac{1}{3}}$$

Where $F_c$ is the force in coulombs on a droplet, and has been calculated as a constant which is the fraction of the instant of droplet evaporation, combustion or loss of charge ($F_c$) measured in coulombs, during which a droplet in a spray cones expansion ceases, and has been calculated as ½($1.036\times10^{-18}$). The factor $J_{0/2}$ is a calculated constant that is defined as the ratio between an instant of evaporation of a spray cone of the conductive fluid and the time of evaporation of the spray cone. The $_{0/2}$ reference includes "$_0$" which represents an "initial value" of the state or object. The "$_{0/2}$" represents the "initial value" divided by 2, assuming that only 2 octolyds will form, which are described below in more detail.

The term R is the radius of a fluid droplet. Initial R (radius) is set by the specification of an injector nozzle, tip or spray apparatus. The manufacturer will provide an estimated droplet diameter based on fluid and pressure. Ionization calculations then estimate that those droplets will be reduced. A droplet, upon atomization, is known to divide into eight separate droplets, which is known as an octolyd. An octolyd has the same volume of fluid as the original droplet but is divided by eight. If there is enough charge still available and time prior to cone cessation, each new droplet forms its own octolyd. It is known by those skilled in the art that a charge, voltage or current is maintained in a droplet for approximately ~11.756 seconds, at which time the droplet charge is lost. A droplet may form 1 to 2 octolyds in that span of time.

The factor 1r is the rate of droplet atomization, which is a standard manufacturing specification, provided for spray nozzles, and varies as to the type of nozzle used. The factor 1t is the duration of atomization, or the length of time for a droplet to travel from a nozzle to a point of impact on a target. The duration of atomization is a physical measurement known to those skilled in the art. The factor pd is the density of the droplet, or the conductive fluid.

In the final equation an Average Current (Ac), expressed in coulombs, is determined. The Ac is the target voltage or target current necessary to maintain in the electrolytic reaction to achieve optimum droplet acceleration within a spray cone and the optimum reduced radius of a fluid droplet. The average current (Ac) is mathematically defined as the power (P) needed to charge a droplet of known density divided by the initial cloud voltage ($V_0$).

$$Ac = \frac{P}{V_o}$$

Where:

$$\frac{P}{V_o} = F_c\left(\frac{3}{4}\pi\right) \cdot R_{o/2} \cdot F_c\left(1r1tpd\frac{1}{2}\right) \cdot E_c 1\left\{\frac{n}{f}\right\}$$

The final equation provides a target voltage or current required by the passive electrolytic reaction to achieve an optimum droplet acceleration within a spray cone and an optimum radius reduction of the droplet, which is reduced to the previously described octolyd.

Using standard modal mass equations, the weights of the selected metals for the component parts for a specific range of conductive fluid densities. For example a calculated ratio of 3.6:1.55 stainless steel (SS) to pure copper (Cu) in the presence of zinc (Zn) produces an optimal charge on commercial heating oil No. 2.

The SS:Cu ratio requires the answer to the above described equations and knowledge of the following data: (1) the resistance of the conductive fluid; and (2) the potential voltage produced by the target reaction, both of which are available from tables. The Standard Reduction Potential Table provides the voltage and assumes that the reaction conditions are 25° C., 101 kPa and uses 1 mole of electrons as the factoral.

The reduction of Cu ($Cu^{+2} \rightarrow Cu + 2e$-) requires two moles of electrons and produces 0.34 volts. The presence of Zinc ($Zn^{+2} \rightarrow Zn + 2e$-) in oxidation requires –0.76 volts. Based on the previously defined mathematical equation, one needs to achieve a specific target flow of electrons measured in coulombs per second (amps), which is 1.0355 amps. The resistance of Heating Oil No. 2 from the Standard Table of Electrical Specific Resistance is 2.2 (the Dielectric Constant for that Fluid). In order to achieve 1.0355 amps (coulombs per second) one needs 1.0355×2.2=2.278 volts to be produced by the reaction, which is an application of Ohm's Law: E (voltage)=I (current)×R (resistance). Using the standard oxidation potentials, one can calculate the molar ratios of the components: 2.23 moles of Cu are required to achieve equilibrium (0.76/0.34=2.23); however, to achieve the target voltage of 2.278 volts, 6.7 more available moles of Cu (2.278/0.34) are required. So the Cu:Zn ratio needs to be 8.93Cu:1Zn.

The 8.93 moles of Cu must be reduced by a harder metal. Stainless steel is a preferred anode metal for an electrolytic reaction of the present invention. Based on Faraday's Law of Electrolysis, one mole of SS will reduce 0.43 moles of Cu to equilibrium over time. Thus, 20.76 moles (8.93 moles Cu/0.43 mass moles) of SS is necessary to reduce all of the Cu for which we get 2.278 volts at 1.0355 coulombs per second in fluid of known resistance. Thus, the ratio of SS:Cu in the presence of zinc is 3.6:1.55. The actual weights of SS and Cu are calculated based on desired elapsed time of the reaction using Faraday's Law: "The mass of an element discharged at an electrode is directly proportional to the amount of electrical charge passed through the electrode."

The electrolytic reaction is continuous and maintains the target voltage within the fluid and reaction chamber. If a flow of electrons exists, there is a constant creation and destruction of free electrons in the fluid. The target voltage for all practical purposes is reached instantly by contact with the conductive fluid and is maintained constantly while in contact with the fluid.

The size of the reaction chamber 11 is determined in part on how long one desires the continuous reaction to take place. In the case of application of the present invention to an internal combustion engine, 65,000 hours of useful life is a target before the mass of metals either oxidizes or falls below the mass required to maintain target voltage. In an internal combustion engine, or any application that utilizes a fuel tank type supply, the reaction chamber is constantly filled with conductive fluid and the reaction is continuous. The charge, however, is transient. As the fluid is continually charged, it is also continuously discharged. The typical reaction takes into account: (1) gasoline engine displacement=350 cu in @8 cylinders=43.75 cu in/injection; and, (2) reaction chamber volume=7.07 cu in (1.5" ID×4.0" L), where ID is an inner diameter of the reaction chamber and L is a length of the reaction chamber. For such an internal combustion, 8.93 moles of Cu, 19.59 moles of SS and 1.0 mole of Zn may be used.

The size of the reaction chamber is not only a factor of the metal masses but also of the fuel flow versus fuel restrictions created by the anode and cathode, and the available space within which the reaction chamber must fit. In a gasoline engine, a 1.5" ID×4" long chamber should work, and a 1" ID×5.5" long chamber would also work, allowing for the correct masses of metals and minimum restriction of fuel flow.

Fluid (in this case, 87 octane gasoline) enters the reaction chamber 11 from the intake lines 17A (or fuel line). An electrolytic reaction chamber takes place in the reaction chamber 11. The induced charge is continually made and remade as the harder metal (stainless steel anode 18) consumes (oxidizes) the softer metal (Cu cathode 19) and the oxidation-controlling member 22 (zinc) reduces the amount of oxide coating the softer metal. The electrolytic charge is contained within the reaction chamber by the magnetic field.

Uncharged fuel flows into the reaction chamber 11 and charged fuel is carried out of the reaction chamber 11 by the physical flow of fuel. The physical force of the moving fuel overcomes the containment of the electrons by the magnet 23. The charged (ionized) fuel then flows through the outgoing line 17B into a combustion chamber. The injection spray droplets then react to the ionization charge by forming smaller droplets that accelerate across the displacement area until the spark ignites the droplets.

While the preferred embodiments of the present invention have been shown and described herein in this context, it will be obvious that such embodiments are provided by way of example only and not of limitation. Numerous variations, changes and substitutions will occur to those of skilled in the art without departing from the invention herein. For example, the present invention need not be limited to atomizing fluids, since other applications can equally benefit from the teachings of the present invention. Accordingly, it is intended that the invention be limited only by the spirit and scope of the appended claims.

What is claimed is:

1. An apparatus for controlling fluid emission by use of passive electrolytic reaction in a conductive fluid, comprising:

(a) a reaction chamber through which said conductive fluid passes, said reaction chamber having an inlet portal and an outlet portal;

(b) a cathode disposed within said reaction chamber;

(c) an anode disposed within said reaction chamber to induce an electrolytic reaction, in combination with the cathode, within the reaction chamber and conductive fluid; and (d) means, associated with said reaction chamber, for discharging said conductive fluid from said reaction chamber at selected intervals.

2. The apparatus of claim 1 further including an oxidization-controlling member disposed within said reaction chamber.

3. The system of claim 2 wherein said oxidation-controlling member comprises a metal selected from the group of metals including zinc, aluminum, lead, tin, nickel and soft amalgams.

4. The apparatus of claim 1 further including an ion-generating member disposed with the reaction chamber.

5. The system of claim 4 wherein said metal ion-generating member includes antimony, cadmium, gold, platinum, and amalgams.

6. The apparatus of claim 1 further including a magnet within said reaction chamber disposed adjacent to the outlet portal of the reaction chamber.

7. The apparatus of claim 1 further including a first screen mounted adjacent to the inlet portal and a second screen mounted within the reaction chamber adjacent to the outlet portal.

8. The apparatus of claim 1 wherein said reaction chamber has a first end cap attached in sealing relationship to said reaction chamber adjacent to said inlet portal and a second end cap attached in sealing relationship to said reaction chamber adjacent to said outlet portal.

9. The system of claim 1 wherein said cathode is chosen from a group of metals including stainless steel, chromium, titanium, vanadium, tungsten, and hard amalgams.

10. The system of claim 1 wherein said anode is a metal chosen from a group of metals including copper or nickel, tin, silver, magnesium or amalgams.

11. A system for the passive electrolytic ionization of a conductive fluid, comprising:

(a) a reaction chamber through which said conductive fluid passes, said reaction chamber having an inlet portal and an outlet portal;

(b) a fluid supply in fluid communication with the reaction chamber through said inlet portal;

(c) said conductive fluid having being electronically biased as a result of ions produced within said reaction chamber from a passive electrolytic ionization reaction taking place within the reaction chamber when said fluid is in said reaction chamber; and, (d) means, associated with said reaction chamber, for discharging said conductive fluid from said reaction chamber at selected intervals.

12. The system of claim 11 further including a cathode disposed within the reaction chamber that produces negatively charged ions and an anode disposed within the reaction chamber that produces positively charged ions.

13. The system of claim 11 wherein said cathode is chosen from a group of metals including stainless steel, chromium, titanium, vanadium, tungsten, and hard amalgams.

14. The system of claim 11 wherein said anode is a metal chosen from a group of metals including copper or nickel, tin, silver, magnesium or amalgams.

15. The system of claim 11 further including an oxidation-controlling member disposed within said reaction chamber.

16. The system of claim 15 wherein said oxidation-controlling member comprises a metal selected from the group of metals including zinc and aluminum, lead, tin, nickel and soft amalgams.

17. The system of claim 11 further including a metal ion-generating member disposed with the reaction chamber.

18. The system of claim 17 wherein said metal ion-generating member comprises a metal selected from the group of metals including antimony, lead or cadmium, gold, platinum, and amalgams.

19. A method for controlling the emission of a conductive fluid, comprising the steps of:

(a) initiating an electrolytic reaction within a reaction chamber containing the conductive fluid in a fluid emission system, and said fluid having a known density; and (b) maintaining said electrolytic reaction at a target voltage necessary to atomize said conductive fluid upon emission of the conductive fluid from said fluid emission system.

20. The method of claim 19 wherein said target voltage is equal to the amount of power necessary to electrically bias a droplet of the conductive fluid divided by an initial voltage at an instant of time when the conductive fluid atomizes whereby the initial voltage is a function of a constant force ($F_c$), in coulombs, on a droplet, multiplied by the ratio ($J_{0/2}$) between an instant of evaporation of a spray cone of the conductive fluid and the time of evaporation of the spray cone.

21. The method of claim 20 wherein $F_c=½(0.74)^{1/3}$.

22. The method of claim 20 wherein $J_{0/2}=½(0.74)^{1/3}$.

23. The method of claim 19 wherein said reaction chamber includes an anode and cathode for initiating the electrolytic reaction.

24. The method of claim 23 wherein said anode and cathode have a preselected weight which is determined based on the calculated target voltage and the density of the fluid having a known electrical specific resistance.

25. The method of claim 24 wherein said reaction chamber includes a plurality of metallic component parts including an anode, a cathode and an oxidation-controlling member.

26. The method of claim 25 wherein said metallic components have a selected weight corresponding to a conductive fluid falling within a range of densities of conductive fluids.

* * * * *